United States Patent
Park et al.

(10) Patent No.: US 12,002,961 B2
(45) Date of Patent: Jun. 4, 2024

(54) ELECTRODE FOR LITHIUM SECONDARY BATTERY AND LITHIUM SECONDARY BATTERY COMPRISING SAME

(71) Applicant: LG Energy Solution, Ltd., Seoul (KR)

(72) Inventors: Jun-Soo Park, Daejeon (KR); Bum-Young Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 600 days.

(21) Appl. No.: 17/266,802

(22) PCT Filed: Jul. 31, 2019

(86) PCT No.: PCT/KR2019/009574
§ 371 (c)(1),
(2) Date: Feb. 8, 2021

(87) PCT Pub. No.: WO2020/032471
PCT Pub. Date: Feb. 13, 2020

(65) Prior Publication Data
US 2021/0344014 A1 Nov. 4, 2021

(30) Foreign Application Priority Data
Aug. 8, 2018 (KR) .................. 10-2018-0092536

(51) Int. Cl.
*H01M 4/62* (2006.01)
*H01M 4/13* (2010.01)
(Continued)

(52) U.S. Cl.
CPC .......... *H01M 4/623* (2013.01); *H01M 4/13* (2013.01); *H01M 4/667* (2013.01); *H01M 10/0525* (2013.01); *H01M 10/4235* (2013.01)

(58) Field of Classification Search
None
See application file for complete search history.

(56) References Cited

U.S. PATENT DOCUMENTS 5,418,091 A 5/1995 Gozdz
5,589,297 A 12/1996 Koga et al.
(Continued)

FOREIGN PATENT DOCUMENTS

JP H07-201363 A 8/1995
JP H08-507407 A 8/1996
(Continued)

OTHER PUBLICATIONS

High temperature stable lithium-ion polymer battery, Park et al., Journal of Power Sources 97-98 (2001) 775-778 (Year: 2001).*
(Continued)

*Primary Examiner* — Scott J. Chmielecki
(74) *Attorney, Agent, or Firm* — Lerner David LLP

(57) ABSTRACT

The present disclosure relates to an electrode for a lithium secondary battery which includes: an electrode current collector; a primer coating layer disposed on at least one surface of the electrode current collector and including a binder and a conductive material; and an electrode active material layer disposed on the primer coating layer, wherein the binder includes poly(vinylidene fluoride-co-hexafluoropropylene) (PVDF-HFP) containing vinylidene fluoride (VDF)-derived repeating units and hexafluoropropylene (HFP)-derived repeating units, the content of HFP-derived repeating units in PVDF-HFP is 2-13 wt %, and the primer coating layer has a thickness of 0.8-10 μm.

14 Claims, 1 Drawing Sheet

(51) Int. Cl.
H01M 4/66 (2006.01)
H01M 10/0525 (2010.01)
H01M 10/42 (2006.01)

(56) References Cited

U.S. PATENT DOCUMENTS

| | | |
|---|---|---|
| 5,827,587 A | 10/1998 | Fukushi |
| 2005/0266310 A1* | 12/2005 | Chia .................... H01M 4/622 |
| | | 429/231.1 |
| 2012/0237824 A1 | 9/2012 | Koh et al. |
| 2013/0143126 A1 | 6/2013 | Jung et al. |
| 2014/0057170 A1 | 2/2014 | Cha et al. |
| 2014/0255742 A1* | 9/2014 | Kwon .................... H01M 4/485 |
| | | 429/94 |
| 2014/0370349 A1* | 12/2014 | Kwon .................... H01M 4/75 |
| | | 429/231.95 |
| 2014/0370350 A1 | 12/2014 | Kwon et al. |
| 2014/0377613 A1 | 12/2014 | Kwon et al. |
| 2014/0377620 A1 | 12/2014 | Kwon et al. |
| 2016/0126555 A1 | 5/2016 | Kwon et al. |
| 2018/0006289 A1* | 1/2018 | Seol .................... H01M 4/667 |
| 2018/0159114 A1* | 6/2018 | Tanihara .............. H01M 4/139 |
| 2018/0301762 A1* | 10/2018 | Kwon .................... H01M 4/13 |
| 2019/0348666 A1* | 11/2019 | Kim .................... H01M 4/622 |
| 2020/0083527 A1* | 3/2020 | Nakamura .......... H01M 4/622 |
| 2020/0168885 A1* | 5/2020 | Lee .................... B23K 26/0622 |

FOREIGN PATENT DOCUMENTS

| | | |
|---|---|---|
| JP | H10-504595 A1 | 5/1998 |
| JP | 2012-238469 A | 12/2012 |
| JP | 2012-253000 A | 12/2012 |
| JP | 2018-190527 A | 11/2018 |
| KR | 10-2012-0014542 A | 2/2012 |
| KR | 10-2014-0026856 A | 3/2014 |
| KR | 10-2014-0132307 A | 11/2014 |
| KR | 10-2015-0050060 A | 5/2015 |
| KR | 10-1746140 B1 | 6/2017 |
| KR | 10-1747332 B1 | 6/2017 |
| KR | 10-1752373 B1 | 6/2017 |
| KR | 10-1775098 B1 | 9/2017 |
| KR | 10-2018-0027953 | 3/2018 |
| KR | 10-2018-0028814 A | 3/2018 |
| KR | 10-2018-0080851 A | 7/2018 |
| WO | 96/05964 A1 | 2/1996 |
| WO | WO2011/037124 A1 | 3/2011 |

OTHER PUBLICATIONS

International Search Report (with partial translation) and Written Opinion issued in corresponding International Patent Application No. PCT/KR2019/009574, dated Nov. 22, 2019.

Extended European Search Report issued in corresponding European Patent Application No. 19846618.7, dated Oct. 26, 2021.

* cited by examiner

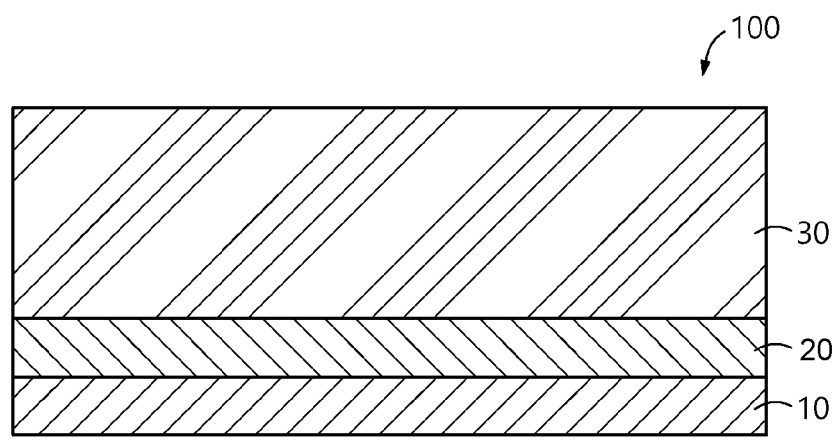

ELECTRODE FOR LITHIUM SECONDARY BATTERY AND LITHIUM SECONDARY BATTERY COMPRISING SAME

TECHNICAL FIELD

The present application claims priority to Korean Patent Application No. 10-2018-0092536 filed on Aug. 8, 2018 in the Republic of Korea. The present disclosure relates to an electrode for a lithium secondary battery and a lithium secondary battery including the same. More particularly, the present disclosure relates to an electrode for a lithium secondary battery which can provide improved nail penetration safety and a lithium secondary battery including the same.

BACKGROUND ART

It is required for lithium secondary batteries for vehicles developed recently to have high energy density and high output. However, development of lithium secondary batteries toward high energy density and output causes degradation of battery safety. In addition, as lithium secondary batteries have been increasingly in demand, a need for safety has been increased significantly. Particularly, when a battery pack is penetrated by external impact or deformation of appearance, explosion of manual devices, such as vehicles, may be generated. Thus, penetration safety has been regarded as an important item among the evaluation items for safety of lithium secondary batteries for vehicles, and many attempts have been made to improve this.

Particularly, it is known that explosion caused by nail penetration results from local IR-heating due to short-circuit current derived from the contact between a nail and an electrode current collector, or between an electrode active material layer and an electrode current collector.

To solve the problem related with such nail penetration safety, it is important to increase the interfacial resistance between an electrode active material layer and an electrode current collector. This is because high-rate current flows due to a short-circuit caused by nail penetration and electrons are transported from an electrode active material to an electrode current collector and a nail at that time. In this context, when resistance is increased, short-circuit current of nail penetration is reduced, and thus IR-heating can be reduced.

DISCLOSURE

Technical Problem

The present disclosure is designed to solve the problems of the related art, and therefore the present disclosure is directed to providing an electrode for a lithium secondary battery which can provide improved nail penetration safety and a lithium secondary battery including the same.

Technical Solution

According to the first embodiment of the present disclosure, there is provided an electrode for a lithium secondary battery which includes: an electrode current collector; a primer coating layer disposed on at least one surface of the electrode current collector and including a binder and a conductive material; and an electrode active material layer disposed on the primer coating layer, wherein the binder includes poly(vinylidene fluoride-co-hexafluoropropylene) (PVDF-HFP) containing vinylidene fluoride (VDF)-derived repeating units and hexafluoropropylene (HFP)-derived repeating units, the content of HFP-derived repeating units in PVDF-HFP is 2-13 wt %, and the primer coating layer has a thickness of 0.8-5 µm.

According to the second embodiment of the present disclosure, there is provided the electrode for a lithium secondary battery as defined in the first embodiment, wherein the primer coating layer includes the binder in an amount of 10-80 parts by weight based on 100 parts by weight of the conductive material.

According to the third embodiment of the present disclosure, there is provided the electrode for a lithium secondary battery as defined in the second embodiment, wherein the primer coating layer includes the binder in an amount of 35-65 parts by weight based on 100 parts by weight of the conductive material.

According to the fourth embodiment of the present disclosure, there is provided the electrode for a lithium secondary battery as defined in any one of the first to the third embodiments, wherein the content of HFP-derived repeating units in PVDF-HFP polymer is 3-10 wt %.

According to the fifth embodiment of the present disclosure, there is provided the electrode for a lithium secondary battery as defined in any one of the first to the fourth embodiments, wherein the primer coating layer has a thickness of 1-2 µm.

According to the sixth embodiment of the present disclosure, there is provided the electrode for a lithium secondary battery as defined in any one of the first to the fifth embodiments, wherein the primer coating layer has a thickness corresponding to 0.01-0.05 times of the thickness of the electrode active material layer.

According to the seventh embodiment of the present disclosure, there is provided the electrode for a lithium secondary battery as defined in the sixth embodiment, wherein the primer coating layer has a thickness corresponding to 0.01-0.03 times of the thickness of the electrode active material layer.

According to the eighth embodiment of the present disclosure, there is provided the electrode for a lithium secondary battery as defined in any one of the first to the seventh embodiments, wherein the binder includes PVDF-HFP in an amount of 50 wt % or more based on 100 wt % of the binder.

According to the ninth embodiment of the present disclosure, there is provided the electrode for a lithium secondary battery as defined in any one of the first to the seventh embodiments, wherein the electrode active material layer includes an electrode binder, and PVDF-HFP is used in an amount of 5 wt % or less based on 100 wt % of the electrode binder.

In another aspect of the present disclosure, there is provided a lithium secondary battery including a positive electrode, a negative electrode and a separator interposed between the positive electrode and the negative electrode, wherein the positive electrode or the negative electrode is the electrode as defined in any one of the first to the ninth embodiments.

Advantageous Effects

The electrode for a lithium secondary battery according to an embodiment of the present disclosure includes a primer coating layer, which includes PVDF-HFP as a binder and a conductive material, interposed between the electrode current collector and the electrode active material layer, and thus can increase the interfacial resistance between the electrode current collector and the electrode active material layer, and reduce the amount of short-circuit current flowing thorough a nail, even when nail penetration occurs, and thus can improve the safety of a battery ultimately.

In addition, HFP contained in PVDF-HFP improves thermal safety of the binder, and thus can reduce the temperature in the battery caused by IR-heating.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a schematic view illustrating the structure of the electrode for a lithium secondary battery according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a negative electrode 100 for a lithium secondary battery, as shown in FIG. 1. The negative electrode 100 for a lithium secondary battery includes: an electrode current collector 10; a primer coating layer 20 disposed on at least one surface of the electrode current collector and containing a binder and a conductive material; and an electrode active material layer 30 disposed on the primer coating layer.

According to an embodiment of the present disclosure, the electrode current collector 10 is not particularly limited, as long as it has conductivity while not causing any chemical change in a battery. For example, the electrode current collector that may be used includes copper, stainless steel, aluminum, nickel, titanium, baked carbon, copper or stainless steel surface-treated with carbon, nickel, titanium, silver, etc., aluminum-cadmium alloy, or the like.

The thickness of the electrode current collector is not particularly limited, but may be 3-500 μm as applied conventionally in the art.

According to an embodiment of the present disclosure, the primer coating layer 20 may include, as a binder, poly(vinylidene fluoride-co-hexafluoropropylene) (PVDF-HFP) containing vinylidene fluoride (VDF)-derived repeating units and hexafluoropropylene (HFP)-derived repeating units. According to an embodiment of the present disclosure, the content of PVDF-HFP may be 50 wt % or more, 80 wt % or more, 90 wt % or more, or 99 wt % or more, based on 100 wt % of the binder.

HFP contained in PVDF-HFP characteristically shows an increase in absorbability to an organic electrolyte, and thus the degree of swelling of the PVDF-HFP binder may be controlled depending on the content of HFP. That is, as the HFP content increases, the swelling of the PVDF-HFP binder also increases.

When using PVDF-HFP as a binder contained in the electrode active material layer, cycle characteristics may be degraded and swelling of a battery may be degraded to cause degradation of battery performance. On the contrary, in the present invention, the primer coating layer includes PVDF-HFP as a binder, instead of the electrode active material layer, thus, the above-mentioned side effect is not problematic.

In other words, the primer coating layer including PVDF-HFP as a binder is disposed between the electrode current collector and the electrode active material layer, and thus can increase the interfacial resistance between the electrode current collector and the electrode active material layer while not affecting swelling of the whole electrode substantially. As a result, even when nail penetration occurs, it is possible to reduce the amount of short-circuit current flowing in the nail, thereby improving the battery safety ultimately.

In addition, HFP improves the thermal safety of the binder, and thus can reduce the temperature in the battery caused by IR-heating.

For these reasons, according to the present disclosure, the primer coating layer disposed between the electrode current collector and the electrode active material layer includes PVDF-HFP binder containing HFP-derived repeating units in an amount of 2-13 wt %, particularly 3-10 wt %, and more particularly 3-7 wt %. When the content of the HFP-derived repeating units is less than 2 wt %, the binder may not be swelled sufficiently with HFP and thermal safety cannot be ensured sufficiently. When the content of HFP is larger than 13 wt %, the binder shows degradation of adhesive property, which is a main function of the binder, and excessive swelling occurs to cause an excessive increase in resistance of the primer coating layer, resulting in degradation of life characteristics.

According to the present disclosure, the weight-based content of repeating units may be determined by using $^1$H-NMR, such as Varian 500 Model.

In addition, the primer coating layer should have a significantly smaller thickness as compared to the electrode active material layer so that it may have little effect upon the swelling of the whole electrode. In other words, the primer coating layer preferably has a thickness of 0.8-5 μm, particularly 1-2 μm, and more particularly 1-1.5 μm. When the primer coating layer has a thickness less than 0.8 μm, it is not possible to provide an effect of increasing resistance and swelling sufficiently. When the primer coating layer has a thickness larger than 10 μm, resistance and swelling are increased excessively, resulting in the problem of degradation of life characteristics.

Particularly, the thickness of the primer coating layer is controlled preferably to 0.01-0.05 times, particularly 0.01-0.03 times of the thickness of the electrode active material layer.

Meanwhile, the primer coating layer may include the PVDF-HFP binder in an amount of 10-80 parts by weight, particularly 35-65 parts by weight, and more particularly 40-50 parts by weight, based on 100 parts by weight of the conductive material. When the content of the PVDF-HFP binder satisfies the above-defined range, it is possible to reduce the amount of short-circuit current upon nail penetration while maintaining adhesion to an electrode, which is an essential purpose of a binder, and thus to provide an effect of improving safety.

The primer coating layer may be formed by applying slurry obtained by dispersing PVDF-HFP as a binder and a conductive material in a solvent onto at least one surface of an electrode current collector.

Herein, the conductive material may be one used currently for an electrode active material layer. For example, the conductive material may include any one selected from graphite, such as natural graphite or artificial graphite; carbon black, such as acetylene black, Ketjen black, channel black, furnace black, lamp black or thermal black; conductive fibers, such as carbon fibers or metallic fibers; metal powder, such as aluminum or nickel powder; conductive whisker, such as zinc oxide or potassium titanate; conductive metal oxide, such as titanium oxide; and conductive materials, such as polyphenylene derivatives, or a mixture of two or more of them.

According to an embodiment of the present disclosure, the electrode active material layer 30 may be formed by applying electrode slurry obtained by dispersing an active material, electrode binder and a conductive material in a solvent onto the primer coating layer 20, followed by drying and pressing.

Herein, when the electrode for a lithium secondary battery according to an embodiment of the present disclosure is a positive electrode, the positive electrode active material may be any material used conventionally as a positive electrode active material for a lithium secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1), $Li_2Mn_3MO_8$ (wherein M=Fe, Co, Ni, Cu or Zn) or $Li_aNi_xCo_yMn_zO_2$ ($0.5<a<1.5$, $0<x$, y, $z<1$, $x+y+z=1$); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; $LiNi_{0.8}Co_{0.1}Mn_{0.1}O_2$; or the like.

Meanwhile, when the electrode for a lithium secondary battery according to an embodiment of the present disclosure is a negative electrode, the negative electrode active material may be any material used conventionally as a negative electrode active material for a lithium secondary battery. For example, the negative electrode active material may include, but are not limited to: carbon such as non-graphitizable carbon, graphitic carbon (natural graphite, artificial graphite), or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0<x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_3$, $Pb_3O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may include a carbonaceous material and/or Si.

The conductive material is not particularly limited, as long as it causes no chemical change in the corresponding battery and has conductivity. For example, the conductive material include any one selected from: graphite, such as natural graphite or artificial graphite; carbon black, such as acetylene black, Ketjen black, channel black, furnace black, lamp black or thermal black; conductive fibers, such as carbon fibers or metallic fibers; metal powder, such as aluminum or nickel powder; conductive whisker, such as zinc oxide or potassium titanate; conductive metal oxide, such as titanium oxide; and conductive materials, such as polyphenylene derivatives, or a mixture of two or more of them. The conductive material may be used in an amount of 0.1-20 wt %, particularly 1-10 wt %, based on the total weight of the electrode active material layer.

In addition, the electrode binder may include at least one selected from: polyvinylidene fluoride (PVDF), polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, styrene butadiene rubber (SBR), carboxymethyl cellulose, or the like, but the scope of the present disclosure is not limited thereto. Meanwhile, PVDF-HFP is not suitable for a binder of an electrode due to the problem of battery swelling. The binder may be used in an amount of 20 wt % or less, 10 wt % or less, 5 wt % or less, or 1 wt % or less, based on the total weight of the electrode active material layer. For example, the binder may be used in an amount of 0.1 wt % or less. Particularly, the electrode binder may include PVDF-HFP in an amount of 5 wt % or less, 1 wt % or less, or 0.1 wt % or less, based on 100 wt % of the total binder.

In another aspect of the present disclosure, there is provided a lithium secondary battery including a positive electrode, a negative electrode and a separator interposed between the positive electrode and the negative electrode, wherein the positive electrode or the negative electrode is the electrode for a lithium secondary battery according to an embodiment of the present disclosure.

Particularly, the electrode for a lithium secondary battery according to an embodiment of the present disclosure may be a positive electrode. The binder for the primer coating layer may be used together with an organic solvent when preparing the coating slurry, and the organic solvent is used more frequently when manufacturing a positive electrode, as compared to a negative electrode. Thus, the electrode for a lithium secondary battery may be applied more advisably to a positive electrode.

The separator is interposed between the positive electrode and the negative electrode and functions to allow lithium ions to pass therethrough, while electrically insulating the positive electrode and the negative electrode from each other. The separator may be any separator used conventionally in the field of lithium secondary batteries with no particular limitation.

The lithium secondary battery according to the present disclosure may be used for a battery module as a unit cell. The battery module may be used for a battery pack or a device including the battery pack as a power source. Particular examples of the device include, but are not limited to:

electric vehicles, hybrid electric vehicles, plug-in hybrid electric vehicles, or electric power storage systems.

Examples will be described more fully hereinafter so that the present disclosure can be understood with ease. However, the following examples are for illustrative purposes only and the scope of the present disclosure is not limited thereto.

Example 1

Manufacture of Positive Electrode (Step 1)

First, 50 parts by weight of PVDF-HFP (HFP content: 3 wt %) as a binder was dissolved in acetonitrile as a solvent to prepare a binder solution. Next, 100 parts by weight of carbon black (Super C65) as a conductive material was introduced to the binder solution to obtain slurry for forming a primer coating layer.

Then, the slurry for forming a primer coating layer was applied to an aluminum current collector having a thickness of 20 μm to a thickness of 2.4 μm, and then vacuum dried at 120° C. for 24 hours to form a primer coating layer.

(Step 2)

First, 4 parts by weight of PVDF as a binder was dissolved in acetonitrile as a solvent to obtain a binder solution, and then 6 parts by weight of carbon black (Super C65) as a conductive material and 90 parts by weight of NCM811 ($LiNi_{0.8}Co_{0.1}Mn_{0.1}O_2$) as a positive electrode active material were added thereto to obtain homogeneous positive electrode slurry.

The positive electrode slurry was applied to the primer coating layer formed from Step 1 to a thickness of 140 μm and vacuum dried at 120° C. for 24 hours to form a positive electrode active material layer. Then, pressing was carried out to finish a positive electrode (thickness of the positive electrode active material layer after pressing: 70 μm, thickness of the primer coating layer after pressing: 1.2 μm, ratio of the thickness of primer coating layer based on the thickness of positive electrode active material layer in the finished positive electrode: 0.017).

Example 2

A positive electrode was obtained in the same manner as Example 1, except that PVDF-HFP (HFP content: 7 wt %) was used as a binder in Step 1.

Comparative Example 1

A positive electrode was obtained in the same manner as Example 1, except that PVDF (HFP content: 0 wt %) was used as a binder in Step 1.

Comparative Example 2

A positive electrode was obtained in the same manner as Example 1, except that PVDF-HFP (HFP content: 20 wt %) was used as a binder in Step 1.

Comparative Example 3

A positive electrode was obtained in the same manner as Example 1, except that thickness of primer coating layer after pressing was 0.3 μm and thickness of the positive electrode active material layer after pressing was 70 μm.

Comparative Example 4

A positive electrode was obtained in the same manner as Example 1, except that thickness of primer coating layer after pressing was 10 μm and thickness of the positive electrode active material layer after pressing was 70 μm.

Test Example

A polyethylene membrane (Celgard: thickness 20 μm) was interposed between each of the positive electrodes obtained from Examples and Comparative Examples and the negative electrode as described hereinafter. Then, an electrolyte containing 1M $LiPF_6$ dissolved in a mixed solvent containing ethylene carbonate, dimethylene carbonate and diethyl carbonate at a ratio of 1:2:1 was injected to obtain a lithium secondary battery. The performance of each lithium secondary battery was evaluated.

The negative electrode was obtained by dispersing 96.3 wt % of artificial graphite as a negative electrode active material, 1.0 wt % of carbon black (Super P) as a conductive material and 2.7 wt % of PVDF as a binder into NMP as a solvent to prepare negative electrode slurry, and applying the negative electrode slurry onto copper foil having a thickness of 10 μm to a thickness of 160 μm, followed by drying and pressing. The negative electrode had a final thickness of 90 μm.

<Evaluation of Nail Penetration Safety>

Five samples were made for each battery and each sample was buffered under the condition of 4.25V. Then, a nail made of iron and having a diameter of 6 mm was allowed to penetrate through the center of each battery from the top thereof by using a nail penetration tester (KSG-103, KYOUNGSUNG testing machine Co., Ltd.). Herein, the nail penetration rate was constantly set to 12 m/min.

Whether the five samples passed the nail penetration safety test or not was judged according to the following evaluation criteria. The number of samples passing the test is shown in the following Table 1.

<Evaluation Criteria>

Pass: no ignition occurs during nail penetration although smog is observed

Fail: ignition occurs immediately during nail penetration or delayed ignition occurs 5 minutes or less after nail penetration (Ignition: flame or flare generation as observed by the naked eyes)

<Life Characteristics>

Each of the batteries was charged/discharged by applying electric current corresponding to 1 C (40 Ah) at a voltage ranging from 3V to 4.25V. After total 100 cycles of charge/discharge were carried out, the capacity retention was calculated by the following formula to evaluate life characteristics.

Capacity retention (%)=(Discharge capacity after 100 cycles/Discharge capacity at the $1^{st}$ cycle)× 100

TABLE 1

| | Primer coating layer | | | |
| --- | --- | --- | --- | --- |
| | HFP content contained in PVDF-HFP binder (wt %) | Coating layer thickness (μm) | Nail penetration safety (number of samples passing the test) | Capacity retention (%) |
| Ex. 1 | 3 | 1.2 | 2/5 | 98.1 |
| Ex. 2 | 7 | 1.2 | 5/5 | 90.5 |

TABLE 1-continued

| | Primer coating layer | | | |
|---|---|---|---|---|
| | HFP content contained in PVDF-HFP binder (wt %) | Coating layer thickness (μm) | Nail penetration safety (number of samples passing the test) | Capacity retention (%) |
| Comp. Ex. 1 | 0 | 1.2 | 0/5 | 98.8 |
| Comp. Ex. 2 | 20 | 1.2 | 5/5 | 70.9 |
| Comp. Ex. 3 | 3 | 0.3 | 0/5 | 98.9 |
| Comp. Ex. 4 | 3 | 10 | 5/5 | 62.5 |

As can be seen from Table 1, Examples 1 and 2 in which the primer coating layer disposed between the electrode current collector and the electrode active material layer includes PVDF-HFP having a content of HFP-derived repeating units of 2-13 wt % and has a thickness of 0.8-5 μm ensure both nail penetration safety and high capacity retention.

On the contrary, Comparative Examples 1-4 which cannot satisfy the above-defined range of HFP content and primer coating layer thickness provide poor results in terms of nail penetration safety or high capacity retention.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An electrode for a lithium secondary battery comprising:
   an electrode current collector; a primer coating layer disposed on at least one surface of the electrode current collector and comprising a binder and a conductive material; and an electrode active material layer disposed on the primer coating layer,
   wherein the binder comprises poly(vinylidene fluoride-co-hexafluoropropylene) (PVDF-HFP) containing vinylidene fluoride (VDF)-derived repeating units and hexafluoropropylene (HFP)-derived repeating units,
   a content of the HFP-derived repeating units in PVDF-HFP is 2-13 wt %, and
   the primer coating layer has a thickness of 0.8-5 μm,
   wherein the primer coating layer comprises the binder in an amount of 26-80 parts by weight based on 100 parts by weight of the conductive material.

2. The electrode for a lithium secondary battery according to claim 1, wherein the primer coating layer comprises the binder in an amount of 35-80 parts by weight based on 100 parts by weight of the conductive material.

3. The electrode for a lithium secondary battery according to claim 2, wherein the primer coating layer comprises the binder in an amount of 35-65 parts by weight based on 100 parts by weight of the conductive material.

4. The electrode for a lithium secondary battery according to claim 1, wherein the content of HFP-derived repeating units in PVDF-HFP is 3-10 wt %.

5. The electrode for a lithium secondary battery according to claim 1, wherein the primer coating layer has a thickness of 1-2 μm.

6. The electrode for a lithium secondary battery according to claim 1, wherein the primer coating layer has a thickness corresponding to 0.01-0.05 times of a thickness of the electrode active material layer.

7. The electrode for a lithium secondary battery according to claim 6, wherein the primer coating layer has a thickness corresponding to 0.01-0.03 times of a thickness of the electrode active material layer.

8. The electrode for a lithium secondary battery according to claim 1, wherein the binder includes PVDF-HFP in an amount of 50 wt % or more based on 100 wt % of the binder.

9. The electrode for a lithium secondary battery according to claim 1, wherein the electrode active material layer comprises an electrode binder, and the electrode binder comprises PVDF-HFP in an amount of 5 wt % or less based on 100 wt % of the electrode binder.

10. A lithium secondary battery comprising a positive electrode, a negative electrode and a separator interposed between the positive electrode and the negative electrode, wherein the positive electrode or the negative electrode is the electrode according to claim 1.

11. The electrode for a lithium secondary battery according to claim 1, wherein the primer coating layer comprises the binder in an amount of 40-50 parts by weight based on 100 parts by weight of the conductive material.

12. The electrode for a lithium secondary battery according to claim 1, wherein the content of HFP-derived repeating units in PVDF-HFP is 3-7 wt %.

13. The electrode for a lithium secondary battery according to claim 1, wherein the electrode active material layer comprises an electrode binder including polyvinylidene fluoride (PVDF).

14. The electrode for a lithium secondary battery according to claim 1, wherein the primer coating layer has a thickness of 1-1.5 μm.

* * * * *